United States Patent
Maurer

(10) Patent No.: US 9,513,059 B2
(45) Date of Patent: Dec. 6, 2016

(54) RADIAL-FLOW HEAT EXCHANGER WITH FOAM HEAT EXCHANGE FINS

(75) Inventor: Scott M. Maurer, Haymarket, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 482 days.

(21) Appl. No.: 13/365,461

(22) Filed: Feb. 3, 2012

(65) Prior Publication Data

US 2012/0199335 A1 Aug. 9, 2012

Related U.S. Application Data

(60) Provisional application No. 61/439,569, filed on Feb. 4, 2011.

(51) Int. Cl.
- *F28D 7/00* (2006.01)
- *F28D 9/00* (2006.01)
- *F28F 13/00* (2006.01)

(52) U.S. Cl.
CPC ............ *F28D 7/0058* (2013.01); *F28D 9/0018* (2013.01); *F28F 13/003* (2013.01); *F28F 2275/062* (2013.01); *Y02E 10/34* (2013.01)

(58) Field of Classification Search
CPC ...... F28D 9/0025; F28D 1/024; F28D 9/0018; F28D 7/0058; F28F 13/003; F28F 2275/062; Y02E 10/34
USPC ................................. 165/165, 125, 164, 166
See application file for complete search history.

(56) References Cited

U.S. PATENT DOCUMENTS

| | | | |
|---|---|---|---|
| 398,645 | A | 2/1889 | Moore |
| 1,525,094 | A | 2/1925 | Jones |
| 2,429,508 | A | 10/1947 | Belaieff |
| 2,693,942 | A | 11/1954 | Guala |

(Continued)

FOREIGN PATENT DOCUMENTS

| | | |
|---|---|---|
| CN | 2199467 Y | 5/1995 |
| CN | 2201284 Y | 6/1995 |

(Continued)

OTHER PUBLICATIONS

International Search Report for international application No. PCT/US2012/023781, dated Aug. 1, 2012 (3 pages).

(Continued)

*Primary Examiner* — Tho V Duong
*Assistant Examiner* — Raheena Rehman
(74) *Attorney, Agent, or Firm* — Withrow & Terranova, PLLC

(57) ABSTRACT

A radial flow plate-fin heat exchanger includes a plurality of heat exchange units connected together to form an annular shaped core. The core has a plurality of first fluid passageways that are circumferentially spaced from one another and that extend generally axially from a first end of the core to a second end. Each of the first fluid passageways is defined at least in part by a plurality of fins that include graphite foam. The core also has a plurality of second fluid passageways that are circumferentially spaced from one another and that extend generally radially from the central fluid passageway through an exterior wall of the core. The second fluid passageways are separated from the first fluid passageways so that a first fluid that flows through the first fluid passageways does not mix with a second fluid that flows through the second fluid passageways.

9 Claims, 15 Drawing Sheets

(56) References Cited

U.S. PATENT DOCUMENTS

| | | | |
|---|---|---|---|
| 2,792,200 A * | 5/1957 | Huggins et al. | 165/149 |
| 2,821,369 A | 1/1958 | Hilliard | |
| 2,834,714 A | 5/1958 | Denison, Jr. et al. | |
| 3,288,573 A | 11/1966 | Abos | |
| 3,289,757 A * | 12/1966 | Rutledge | F25J 3/04412 165/166 |
| 3,294,159 A | 12/1966 | Kovalik et al. | |
| 3,334,026 A | 8/1967 | Dobell | |
| 3,359,753 A | 12/1967 | Fiedler et al. | |
| 3,400,758 A | 9/1968 | Suk Lee | |
| 3,489,654 A | 1/1970 | Geiringer | |
| 3,595,310 A | 7/1971 | Burne et al. | |
| 3,630,276 A | 12/1971 | Palne et al. | |
| 3,818,984 A * | 6/1974 | Nakamura et al. | 165/166 |
| 4,136,428 A | 1/1979 | Godsey et al. | |
| 4,325,734 A | 4/1982 | Burrage et al. | |
| 4,347,083 A | 8/1982 | Sara | |
| 4,360,059 A | 11/1982 | Funke | |
| 4,438,809 A * | 3/1984 | Papis | F28D 9/0018 165/166 |
| 4,475,988 A | 10/1984 | Tsumura et al. | |
| 4,493,368 A | 1/1985 | Gronnerud et al. | |
| 4,697,321 A | 10/1987 | Shibuya et al. | |
| 4,699,211 A | 10/1987 | Geary et al. | |
| 4,715,438 A * | 12/1987 | Gabuzda et al. | 165/185 |
| 4,724,754 A | 2/1988 | Crozat et al. | |
| 4,993,223 A * | 2/1991 | Kretzinger | F28D 9/0018 165/166 |
| 5,046,331 A | 9/1991 | O'Neal et al. | |
| 5,058,664 A | 10/1991 | Gentry | |
| 5,063,663 A | 11/1991 | Casterline | |
| 5,078,206 A * | 1/1992 | Goetz, Jr. | F28D 1/0426 123/41.49 |
| 5,095,708 A | 3/1992 | Kalina | |
| 5,100,049 A | 3/1992 | Divecha et al. | |
| 5,113,052 A | 5/1992 | Gabriel | |
| 5,132,780 A * | 7/1992 | Higgins, III | 257/722 |
| 5,172,752 A * | 12/1992 | Goetz, Jr. | 165/41 |
| 5,273,106 A * | 12/1993 | Drake | F28D 9/0012 165/164 |
| 5,480,676 A | 1/1996 | Sonuparlak et al. | |
| 5,513,494 A | 5/1996 | Flynn et al. | |
| 5,582,245 A * | 12/1996 | Niimi | 165/166 |
| 5,755,280 A | 5/1998 | da Costa et al. | |
| 5,797,449 A * | 8/1998 | Oswald et al. | 165/165 |
| 5,832,991 A | 11/1998 | Cesaroni | |
| 5,878,590 A * | 3/1999 | Kadle et al. | 62/271 |
| 5,882,461 A * | 3/1999 | Rogut | B01D 63/02 156/182 |
| 6,167,713 B1 | 1/2001 | Hartfield et al. | |
| 6,259,165 B1 | 7/2001 | Brewington | |
| 6,386,275 B1 * | 5/2002 | Kuo et al. | 165/80.3 |
| 6,438,936 B1 * | 8/2002 | Ryan | 60/39.511 |
| 6,516,627 B2 | 2/2003 | Ring et al. | |
| 6,537,351 B2 | 3/2003 | Margiott et al. | |
| 6,552,902 B2 * | 4/2003 | Cho et al. | 361/704 |
| 6,673,328 B1 | 1/2004 | Klett et al. | |
| 6,694,740 B2 | 2/2004 | Nayar | |
| 6,763,671 B1 | 7/2004 | Klett et al. | |
| 6,780,505 B1 | 8/2004 | Klett et al. | |
| 6,827,138 B1 | 12/2004 | Master et al. | |
| 6,838,202 B2 | 1/2005 | Brady et al. | |
| 7,013,963 B2 | 3/2006 | Laine et al. | |
| 7,063,130 B2 * | 6/2006 | Huang | 165/121 |
| 7,147,214 B2 | 12/2006 | Klett et al. | |
| 7,306,654 B2 | 12/2007 | King et al. | |
| 7,331,381 B2 | 2/2008 | Wang et al. | |
| 7,401,643 B2 | 7/2008 | Queheillalt et al. | |
| 7,431,805 B2 | 10/2008 | Beckman | |
| 7,472,549 B2 | 1/2009 | Brewington | |
| 7,740,057 B2 | 6/2010 | Wang et al. | |
| 7,762,101 B1 | 7/2010 | Zuili et al. | |
| 7,766,076 B2 * | 8/2010 | Khalili et al. | 165/104.33 |
| 7,857,039 B2 | 12/2010 | Nakamura | |
| 8,020,610 B2 | 9/2011 | Soldner et al. | |
| 3,272,431 A1 | 9/2012 | Campagna et al. | |
| 8,567,195 B2 | 10/2013 | Nash | |
| 8,800,849 B2 | 8/2014 | Jansen et al. | |
| 9,080,818 B2 | 7/2015 | Maurer et al. | |
| 2002/0017108 A1 | 2/2002 | Schooley | |
| 2002/0121359 A1 | 9/2002 | Heikkila et al. | |
| 2003/0000486 A1 | 1/2003 | Ott et al. | |
| 2003/0154865 A1 | 8/2003 | Zornes | |
| 2003/0173062 A1 | 9/2003 | Lomax, Jr. et al. | |
| 2004/0194944 A1 | 10/2004 | Hendricks et al. | |
| 2004/0244398 A1 | 12/2004 | Radermacher et al. | |
| 2005/0008890 A1 | 1/2005 | Raghunathan et al. | |
| 2005/0109493 A1 | 5/2005 | Wu et al. | |
| 2005/0121304 A1 | 6/2005 | Beckman | |
| 2005/0178534 A1 | 8/2005 | Kienbock et al. | |
| 2006/0124284 A1 | 6/2006 | Ushio et al. | |
| 2006/0162913 A1 | 7/2006 | Wanni et al. | |
| 2006/0237172 A1 * | 10/2006 | Lo | 165/125 |
| 2006/0254757 A1 | 11/2006 | Kamsma | |
| 2007/0119907 A1 | 5/2007 | Rodhammer | |
| 2007/0144500 A1 | 6/2007 | Dupree et al. | |
| 2007/0175609 A1 * | 8/2007 | Christ et al. | 165/10 |
| 2007/0199683 A1 * | 8/2007 | Emrich | 165/125 |
| 2007/0228109 A1 | 10/2007 | Smith et al. | |
| 2007/0228113 A1 | 10/2007 | Dupree et al. | |
| 2007/0284095 A1 * | 12/2007 | Wang et al. | 165/166 |
| 2008/0093059 A1 | 4/2008 | Nishida | |
| 2008/0149311 A1 | 6/2008 | Liu et al. | |
| 2008/0166492 A1 | 7/2008 | Lu et al. | |
| 2008/0196879 A1 | 8/2008 | Behrens et al. | |
| 2008/0251215 A1 | 10/2008 | Chen | |
| 2008/0251238 A1 | 10/2008 | Gudmundsson | |
| 2009/0126918 A1 | 5/2009 | Campagna et al. | |
| 2009/0178790 A1 | 7/2009 | Schreiber et al. | |
| 2009/0218070 A1 | 9/2009 | Fries et al. | |
| 2009/0288814 A1 | 11/2009 | Stoia et al. | |
| 2009/0308571 A1 * | 12/2009 | Thompson et al. | 165/79 |
| 2009/0308582 A1 * | 12/2009 | Nagurny et al. | 165/167 |
| 2010/0006273 A1 | 1/2010 | Du et al. | |
| 2010/0055478 A1 | 3/2010 | Chaumat et al. | |
| 2010/0181054 A1 | 7/2010 | Nagurny et al. | |
| 2010/0314081 A1 | 12/2010 | Reis et al. | |
| 2010/0318437 A1 | 12/2010 | Yee et al. | |
| 2011/0011570 A1 | 1/2011 | Levings et al. | |
| 2011/0011572 A1 | 1/2011 | Nagurny et al. | |
| 2011/0016906 A1 | 1/2011 | Zuili et al. | |
| 2011/0079375 A1 | 4/2011 | Nagurny et al. | |
| 2011/0127022 A1 | 6/2011 | Eller et al. | |
| 2012/0091729 A1 | 4/2012 | Nash | |
| 2012/0177488 A1 | 7/2012 | Corman | |
| 2012/0199330 A1 | 8/2012 | Maurer et al. | |
| 2012/0199331 A1 | 8/2012 | Maurer et al. | |
| 2012/0199334 A1 | 8/2012 | Maurer et al. | |
| 2012/0282454 A1 | 11/2012 | Jansen et al. | |
| 2013/0146250 A1 | 6/2013 | Eller et al. | |
| 2013/0146437 A1 | 6/2013 | Maurer et al. | |

FOREIGN PATENT DOCUMENTS

| | | |
|---|---|---|
| CN | 1149707 A | 5/1997 |
| CN | 1276515 A | 12/2000 |
| DE | 854658 C | 11/1952 |
| DE | 1117148 B | 11/1961 |
| DE | 1161922 B | 1/1964 |
| DE | 3615300 A1 | 11/1987 |
| DE | 19850557 A1 | 5/2000 |
| DE | 10221138 A1 | 2/2004 |
| EP | 1553379 A1 | 7/2005 |
| EP | 2 124 009 | 11/2009 |
| GB | 2424265 A | 9/2005 |
| JP | 03207993 A | 9/1991 |
| JP | 2009005683 A | 1/2009 |
| WO | 9966136 A1 | 12/1999 |
| WO | 2004027336 A1 | 4/2004 |
| WO | 2008042893 A2 | 4/2008 |

(56) References Cited

FOREIGN PATENT DOCUMENTS

| WO | 2009137653 A2 | 11/2009 |
|---|---|---|
| WO | 2010116230 A2 | 10/2010 |

OTHER PUBLICATIONS

Written Opinion for international application No. PCT/US2012/023781, dated Aug. 1. 2012 (6 pages).
Author Unknown, "500F Thermally Conductive Epoxies," located online at www.cotronics.com/vo/cotr/ea_thermallyconductive.htm, 2008, Cotronics Corp., 2 pages.
Author Unknown, "Vahterus PSHE Series Plate and Shell Heat Exchangers," product description, TI-P228-01, CH Issue 1, located online at www.spiraxsarco.com/pdfs/TI/p228_01.pdf, Spirax Sarco, 2007, 2 pages.
Author Unknown, "S-Bond Technology: Foams," located online at www.s-bond.com/SolderJointStructures/Foams.htm, S-Bond Technologies, accessed May 16, 2016, 2 pages.
Author Unknown, "The Fiberglass Advantages," Fiberglass Fabrication, Jun. 23, 2003 (date obtained using wayback machine), Structural Fiberglass Inc., www.structuralfiberglass.com/advant, 1 page.
Author Unknown, "Graphite Foam," Oak Ridge National Laboratory, Issue 174, Section: Smart Technology, Apr. 2, 2002, http://www.autospeed.com/cms/title_Graphite-Foam/A__1339/printArticle.html, 4 pages.
Author Unknown, "Main Thermocline," Aerographer/Meteorology, Apr. 15, 2003 (date obtained using wayback machine), Integrated Publishing, Inc., www.tpub.com/weather3/1-21, 2 pages.
El-Dessouky, H. et al., "Plastic/compact heat exchangers for single-effect desalination systems," Desalination 122, 1999, pp. 271-289.
Harrison, Sara, "Ocean Thermal Energy Conversion," Submitted as coursework for Physics 240, Stanford University, Nov. 28, 2010, large.stanford.edu/courses/2010/ph240/harrison2/, pp. 1-6.
Jacobi, A.M. et al., "Novel Materials for Heat Exchangers," Air Conditioning and Refrigeration Center, Mechanical Science and Engineering, University of Illinois, ARTI Report No. 06030-01, Mar. 2008, 446 pages.
Klett, J., "High Thermal Conductivity Graphite Foams for Compact Lightweight Radiators," Oak Ridge National Laboratory, U.S. Department of Energy, www.ms.oml.gov/sections/mpsl/Cimtech/default.htm, May 9, 2002, 17 slides.
Malloy, D., "Lockheed Martin's Approach to Alternative Energy," E2DI Journal, www,e2dinternational.co.uk and www .dynamixx.co.uk, Jun. 2009, pp. 14-15.
Narayan, G. Prakash et al., "Helium as a Carrier Gas in Humidification Dehumidification Desalination Systems," Proceedings of ASME 2011 International Mechanical Engineering Congress and Exposition (IMECE), IMECE2011-62875, Nov. 11-17, 2011, Denver, Colorado, ASME, 8 pages.
Shah, Ramesh K., "Extended Surface Heat Transfer," Thermopedia, Feb. 14, 2011, www.thermopedia.com/content/750, pp. 1-8.
International Search Report and Written Opinion for International Patent Application No. PCT/US2012/023781, mailed Aug. 1, 2012, 8 pages.
International Preliminary Report on Patentability for International Patent Application No. PCT/US2012/023781, mailed Aug. 15, 2013, 7 pages.
Invitation to Pay Additional Fees and Partial International Search for PCT/US2012/066294, mailed Aug. 1, 2013, 6 pages.
International Search Report and Written Opinion for PCT/US2012/066294, mailed Oct. 25, 2013, 16 pages.
International Preliminary Report on Patentability for PCT/US2012/066294, mailed May 27, 2014, 11 pages.
International Search Report and Written Opinion for PCT/US2012/068536, mailed Jun. 17, 2013, 11 pages.
International Preliminary Report on Patentability for PCT/US2012/068536, mailed Jun. 10, 2014, 9 pages.
Partial International Search for International Patent Application No. PCT/US2012/023783, mailed Jun. 4, 2012, 2 pages.
International Search Report and Written Opinion for International Patent Application No. PCT/US2012/023783, mailed Sep. 20, 2012, 13 pages.
International Preliminary Report on Patentability for International Patent Application No. PCT/US2012/023783, mailed Aug. 15, 2013, 9 pages.
International Search Report and Written Opinion for International Patent Application No. PCT/US2012/023786, mailed Jan. 21, 2013, 9 pages.
International Preliminary Report on Patentability for International Patent Application No. PCT/US2012/023786, mailed Aug. 15, 2013, 7 pages.
International Search Report and Written Opinion for International Patent Application No. PCT/US2012/023788, mailed Jul. 30, 2012, 9 pages.
International Preliminary Report on Patentability for International Patent Application No. PCT/US2012/023788, mailed Aug. 15, 2013, 7 pages.
International Search Report and Written Opinion for International Patent Application No. PCT/US2012/030853, mailed Jul. 3, 2012, 7 pages.
International Preliminary Report on Patentability for International Patent Application No. PCT/US2012/030853, mailed Nov. 14, 2013, 6 pages.
Non-final Office Action for U.S. Appl. No. 13/365,456, mailed May 22, 2014, 11 pages.
Final Office Action for U.S. Appl. No. 13/365,456, mailed Dec. 5, 2014, 12 pages.
Notice of Allowance for U.S. Appl. No. 13/365,456, mailed Mar. 23, 2015, 7 pages.
Non-final Office Action for U.S. Appl. No. 13/365,459, mailed Mar. 26, 2015, 10 pages.
Non-final Office Action for U.S. Appl. No. 13/365,459, mailed Dec. 9, 2015, 9 pages.
Non-Final Office Action for U.S. Appl. No. 13/708,457, mailed Oct. 24, 2014, 18 pages.
Final Office Action for U.S. Appl. No. 13/708,457, mailed Feb. 13, 2015, 18 pages.
Non-Final Office Action for U.S. Appl. No. 13/708,457, mailed Sep. 11, 2015, 16 pages.
Non-Final Office Action for U.S. Appl. No. 13/683,534, mailed Oct. 19, 2015, 25 pages.
Non-final Office Action for U.S. Appl. No. 13/365,460, mailed Mar. 25, 2015, 13 pages.
Non-final Office Action for U.S. Appl. No. 13/365,460, mailed Aug. 28, 2015, 16 pages.
Final Office Action for U.S. Appl. No. 13/365,460, mailed Apr. 21, 2016, 17 pages.
Notice of Allowance and Examiner-Initiated Interview Summary for U.S. Appl. No. 13/431,361, mailed Apr. 14, 2014, 9 pages.
Author Unknown, "Closed Cycle Ocean Thermal Energy Conversion (OTEC)," Renewable Energy Sources, newenergyportal.wordpress.com/2009/12/15/closed-cycle-ocean-thermal-energy-conversion-oted, Dec. 15, 2009, 4 pages.
Notice of Allowance for U.S. Appl. No. 13/365,459 mailed Jun. 9, 2016, 7 pages.
Final Office Action for U.S. Appl. No. 13/708,457, mailed Apr. 7, 2016, 16 pages.
Final Office Action for U.S. Appl. No. 13/683,534, mailed May 19, 2016, 20 pages.
Advisory Action and AFCP 2.0 Decision for U.S. Appl. No. 13/683,534, mailed Sep. 7, 2016, 7 pages.
Advisory Action for U.S. Appl. No. 13/365,460, mailed Jul. 28, 2016, 3 pages.

* cited by examiner

FIG. 7
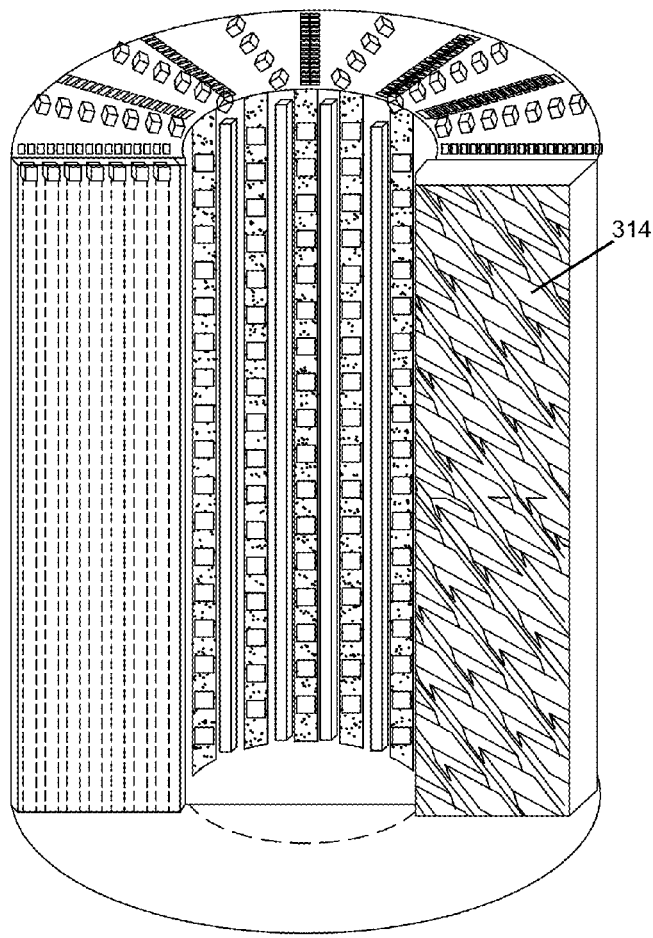
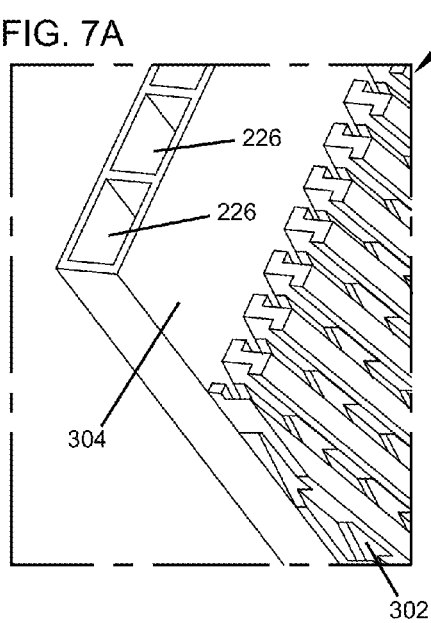
FIG. 7A
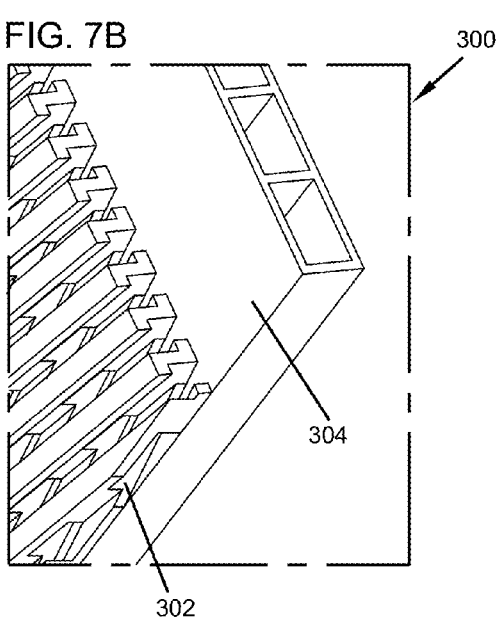
FIG. 7B ically conductive foam material including, but not limited to,
RADIAL-FLOW HEAT EXCHANGER WITH FOAM HEAT EXCHANGE FINS This application claims the benefit of U.S. Provisional Applicant Ser. No. 61/439,569, filed on Feb. 4, 2011, the entire contents of which are incorporated herein by reference.

FIELD

This disclosure relates to heat exchangers in general, and, more particularly, to a radial flow heat exchanger that uses foam heat exchange fins.

BACKGROUND

Heat exchangers are used in many different types of systems for transferring heat between fluids in single phase, binary or two-phase applications. Many different types of heat exchangers are known including plate-fin, plate-frame, and shell-and-tube heat exchangers. In plate-fin heat exchangers, a first fluid or gas is passed on one side of the plate and a second fluid or gas is passed on another side of the plate. The first fluid and/or the second fluid flow along channels between fins mounted on one side of the plate, and heat energy is transferred between the first fluid and second fluid through the fins and the plate. Materials such as titanium, high alloy steel, copper and aluminum are typically used for the plates, frames, and fins. The use of radial-flow heat exchangers in air-air heat exchange applications is known.

Brazed aluminum heat exchangers are mostly used in small, compact and highly efficient heat exchange operations. However, some heat exchange applications utilize a small temperature differential and thus require higher efficiency to make use of heat exchangers in those applications economical.

SUMMARY

This description relates to a radial-flow heat exchanger that employs fins made partially or entirely of thermally conductive foam to enhance heat transfer. The radial-flow heat exchangers with foam fins described herein are highly efficient, inexpensive to build, and corrosion resistant. The described heat exchangers can be used in a variety of applications, including but not limited to, low thermal driving force applications, power generation applications, and non-power generation applications such as refrigeration and cryogenics. The fins can be made from any thermally conductive foam material including, but not limited to, graphite foam or metal foam.

The term "radial-flow" as used herein refers to the fact that the flow of one of the fluids is in a generally radially outward or radially inward direction. Regardless of whether the flow is radially inward or radially outward, the radially flowing fluid flows in a cross-flow arrangement with a second fluid.

In one embodiment, a radial flow plate-fin heat exchanger includes an annular-shaped core having an axial length extending from a first end to a second end, and a central fluid passageway extending from the first end to the second end and defined by an interior wall of the core. The heat exchanger has a plurality of first fluid passageways that are circumferentially spaced from one another and that extend generally axially from the first end to the second end, and each of the first fluid passageways is defined at least in part by a plurality of fins that include thermally conductive foam. In addition, the heat exchanger has a plurality of second fluid passageways that are circumferentially spaced from each other and that extend generally radially from the central fluid passageway through the outer perimeter of the heat exchanger. The second fluid passageways are separated from the first fluid passageways so that a first fluid that flows through the first fluid passageways does not mix with a second fluid that flows through the second fluid passageways.

In another embodiment, a radial flow heat exchanger includes an annular-shaped core having an axial length extending from a first end to a second end, a central fluid passageway extending from the first end to the second end and defined by an interior wall of the core, and an exterior wall. The heat exchanger includes a plurality of heat exchange units that are connected together into an annulus, and each of the heat exchange units includes a plate and a plurality of fins connected to and in thermal contact with a surface of the plate. The fins include a thermally conductive foam, such as metal foam or graphite foam. In some circumstances, the fins need not be made of thermally conductive foam. Instead, the fins can be made of metal such as aluminum, or a combination of aluminum fins and thermally conductive foam fins can be used.

Each plate of the plurality of heat exchange units has first and second ends, and the first and second ends of each plate are friction-stir welded to the interior wall and the exterior wall, respectively. In addition, each plate defines radial fluid passageways, and the radial fluid passageways of each plate are circumferentially spaced from the radial fluid passageways of the other plates, and the radial fluid passageways of each plate extend generally radially through the interior wall and through the exterior wall of the heat exchanger to place the central fluid passageway in fluid communication with an exterior of the heat exchanger. The fins define fluid passageways that are circumferentially spaced from one another and that extend generally axially from the first end to the second end of the heat exchanger. Also, the radial fluid passageways are separated from the fluid passageways defined by the fins so that a first fluid that flows through the fluid passageways defined by the fins does not mix with a second fluid that flows through the radial fluid passageways.

In another embodiment, the fins form the radial fluid passageways while the plates define the axial fluid passageways.

DRAWINGS

FIG. 7 shows another embodiment of a radial flow heat exchanger core with the plate forming the axial flow passageways and the foam fins forming the radial flow passageways.

FIG. 7A is a close up view of a portion of a heat exchange unit of FIG. 7.

FIG. 7B is a close up view of a portion of a heat exchange unit of FIG. 7.

FIGS. 11A-M show additional embodiments of fin arrangements that can be used with the described heat exchange units.

Figure 12A:
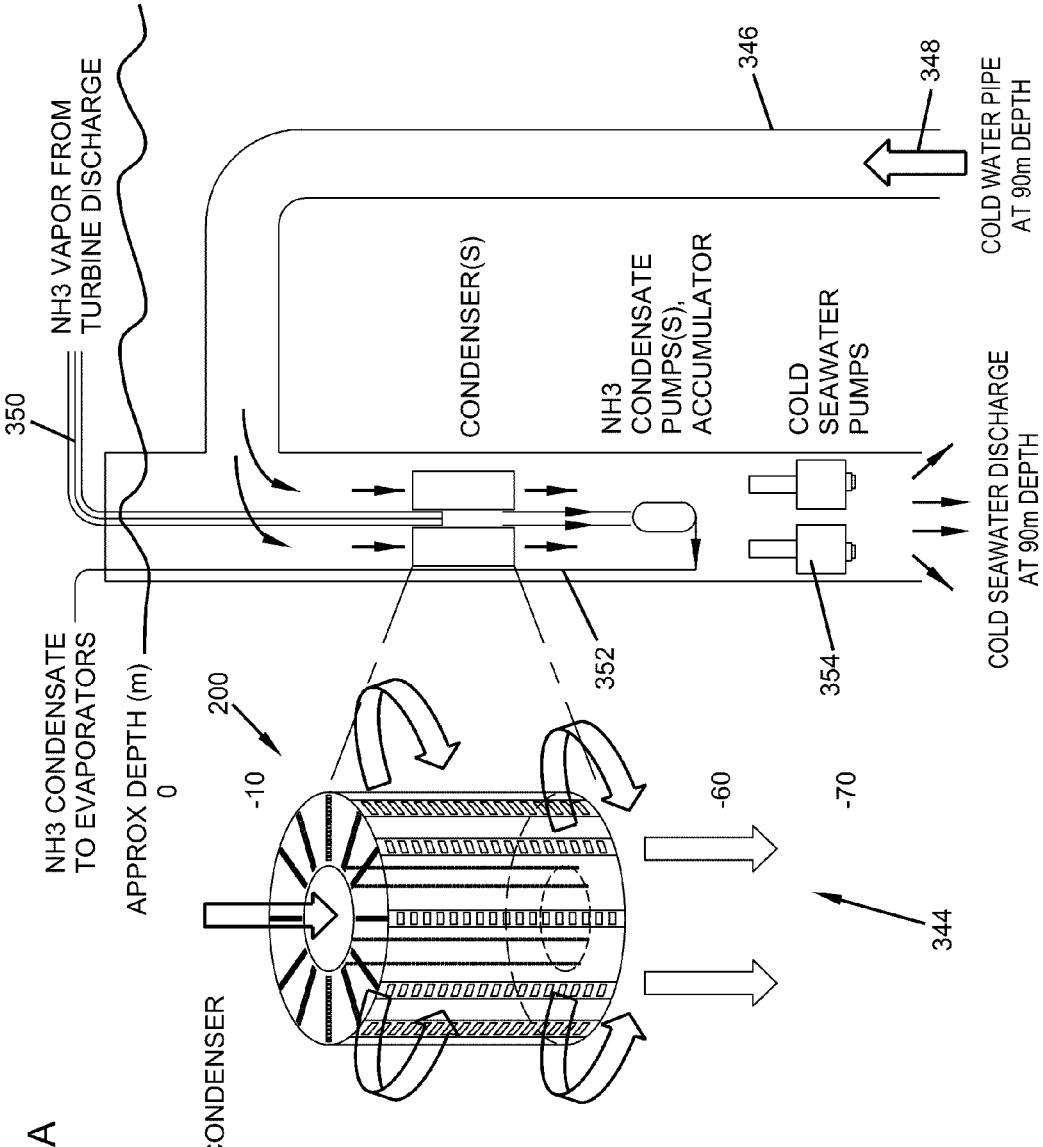
Figure 12C:
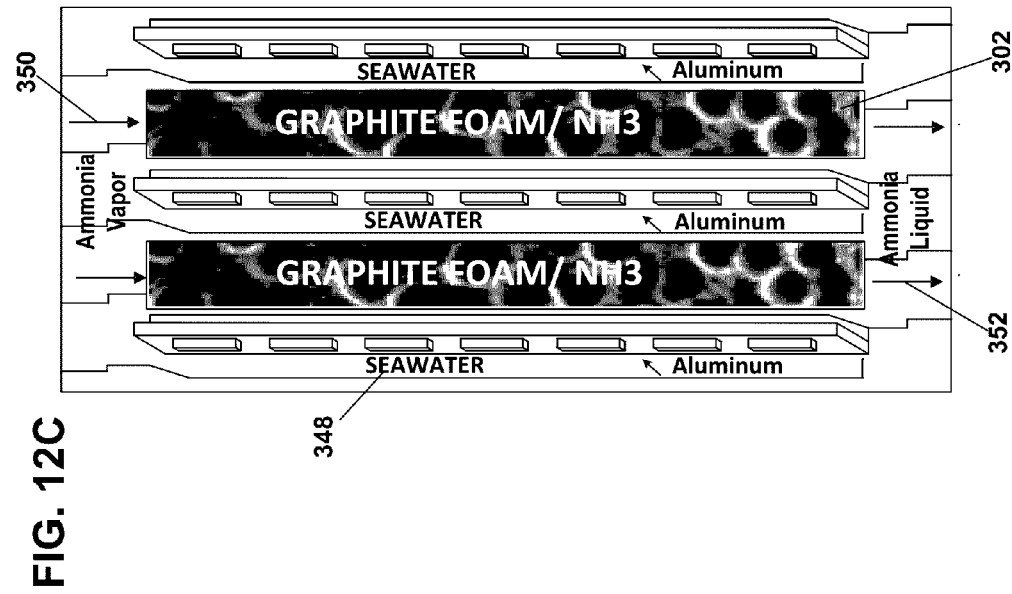
Figure 12B:
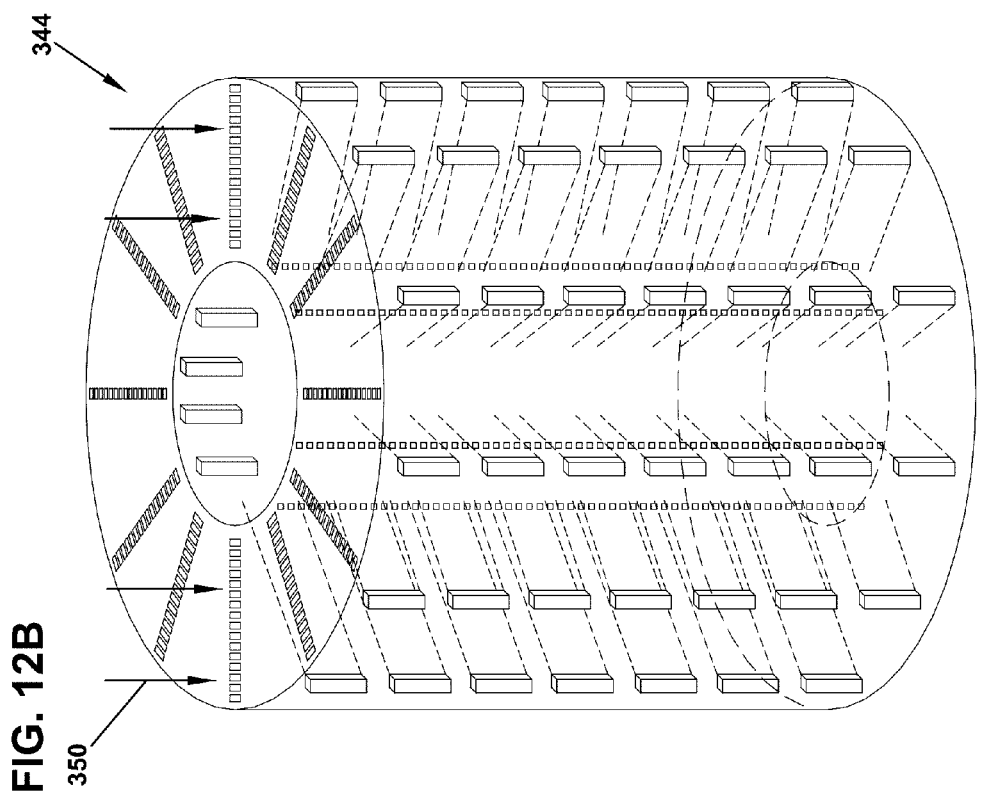

FIGS. 12A, 12B and 12C show a radial-flow heat exchanger core described herein used as a condenser.

Figure 13A:
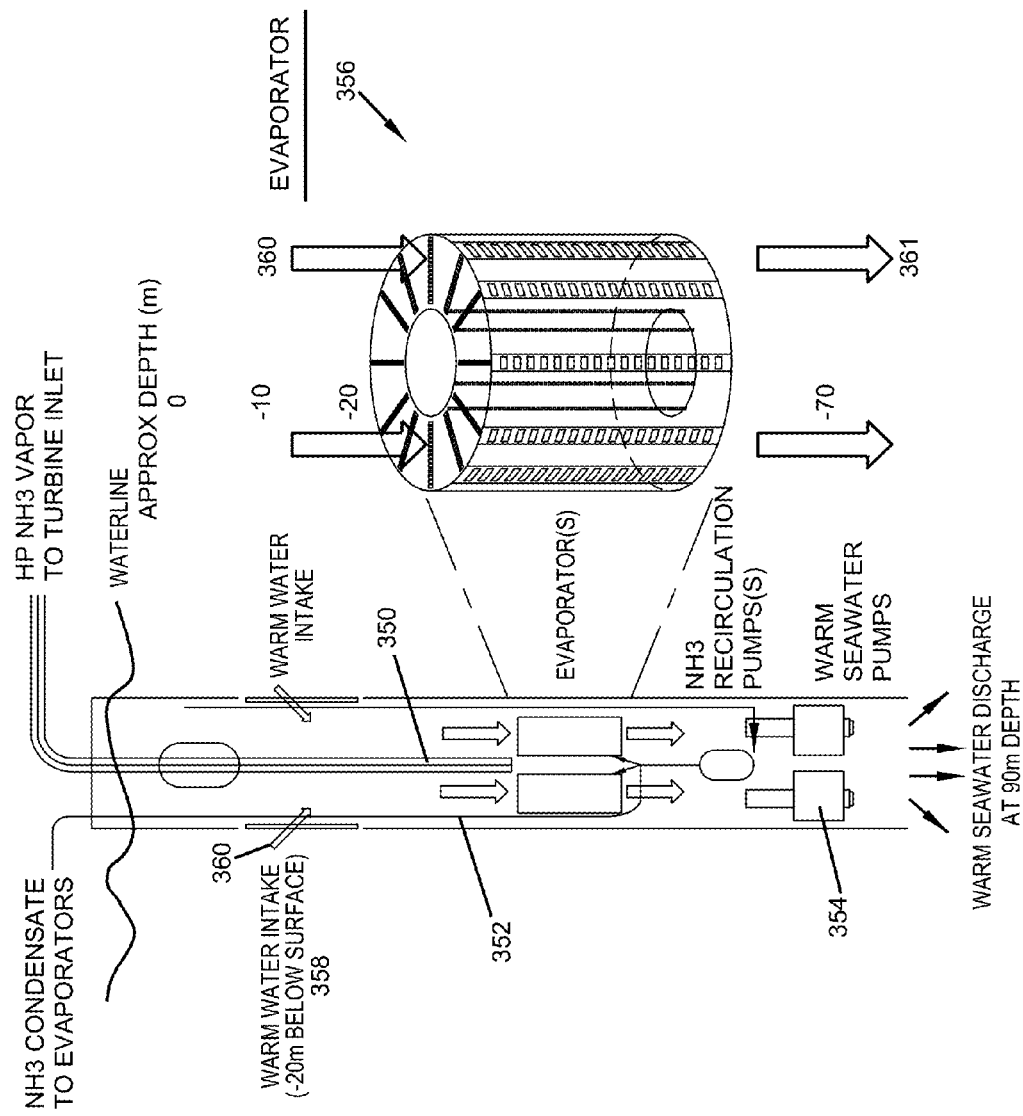
Figure 13C:
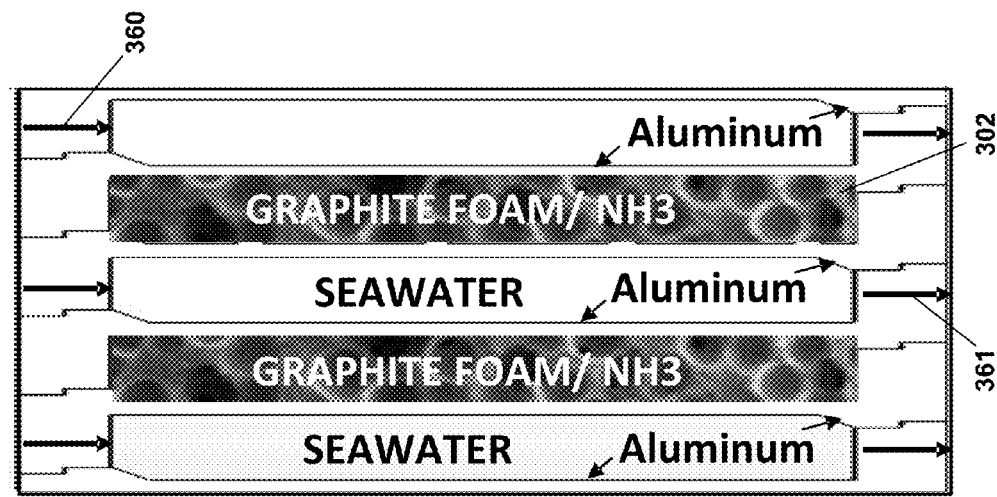
Figure 13B:
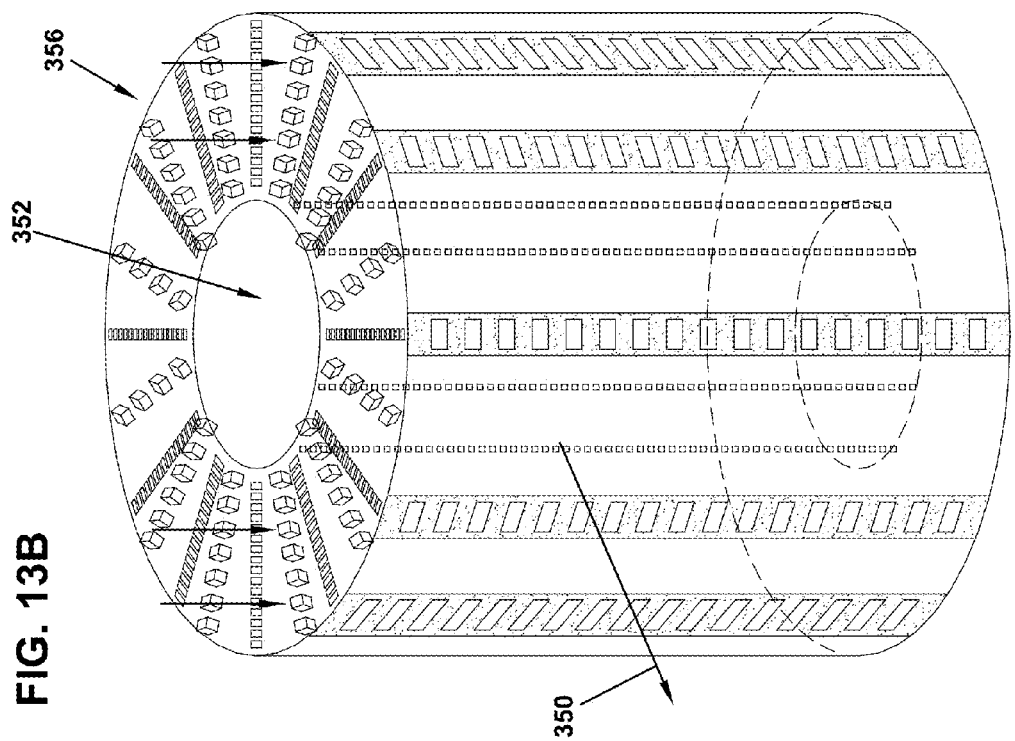

FIGS. 13A, 13B and 13C show a radial-flow heat exchanger core described herein used as an evaporator.

Figure 14:
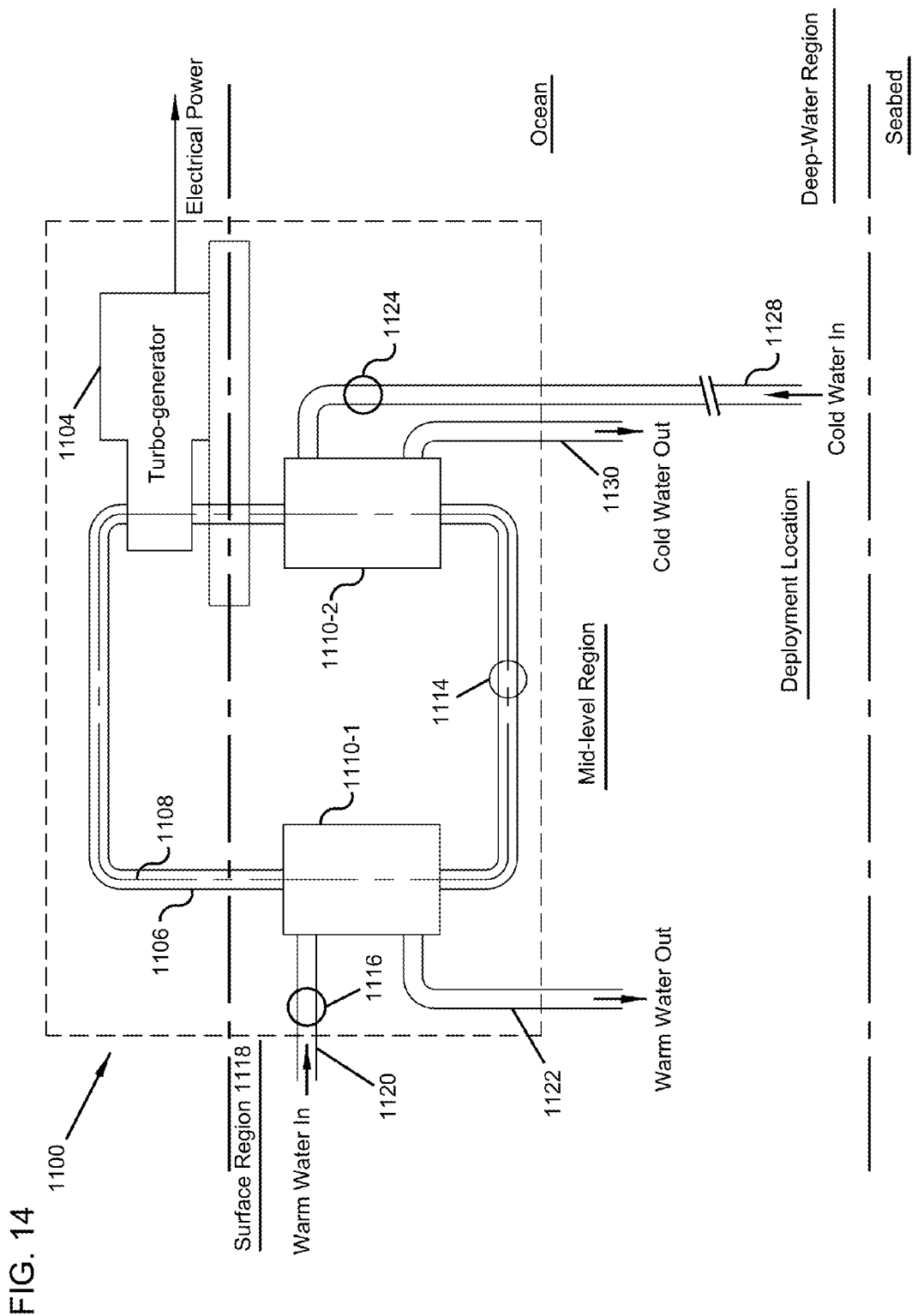

FIG. 14 shows a schematic diagram of an embodiment of a power generation system that can employ the heat exchangers described herein.

DETAILED DESCRIPTION

Figure 1:
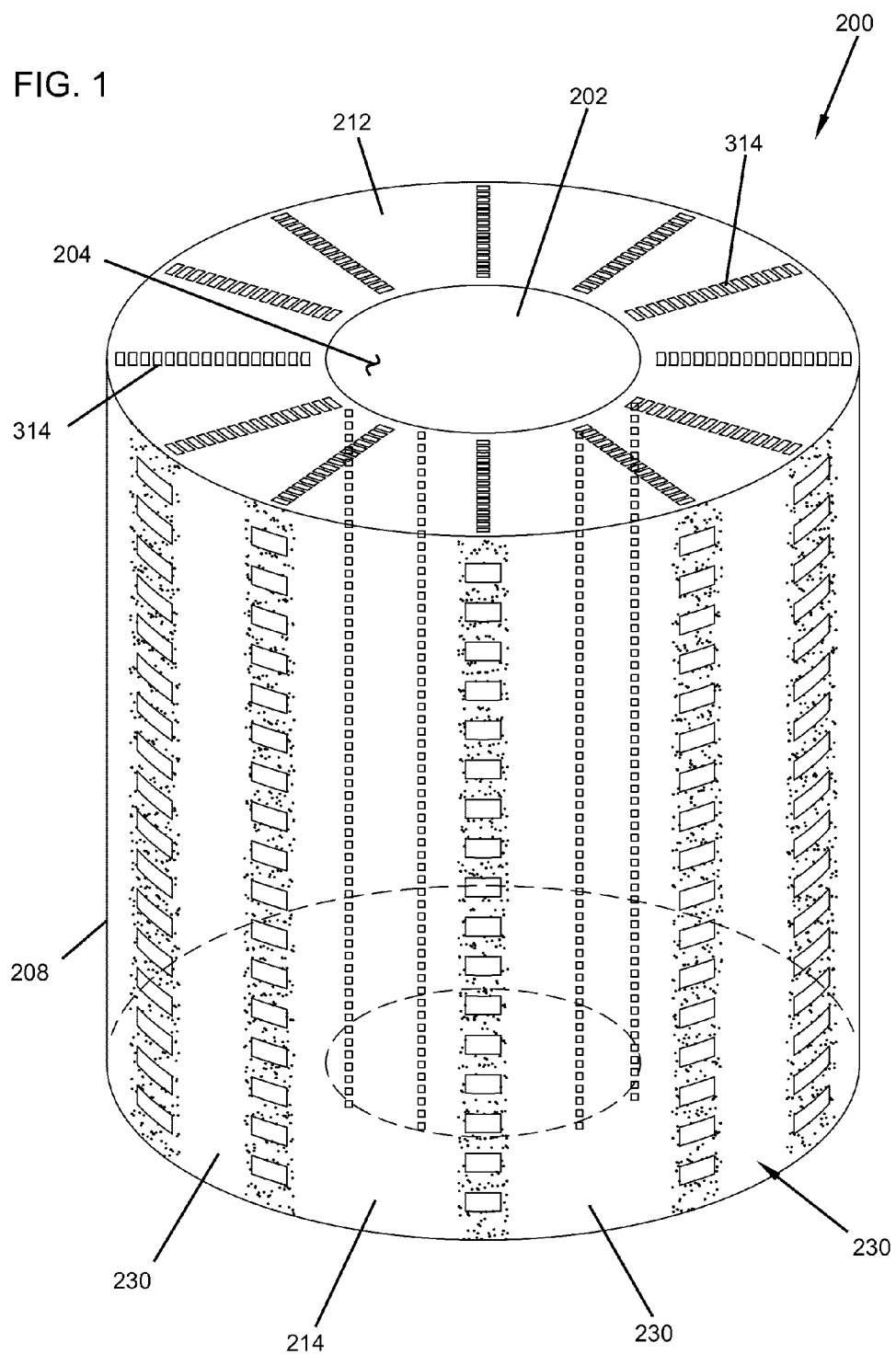
FIG. 1 shows an embodiment of a radial flow heat exchanger core described herein.
Figure 2:
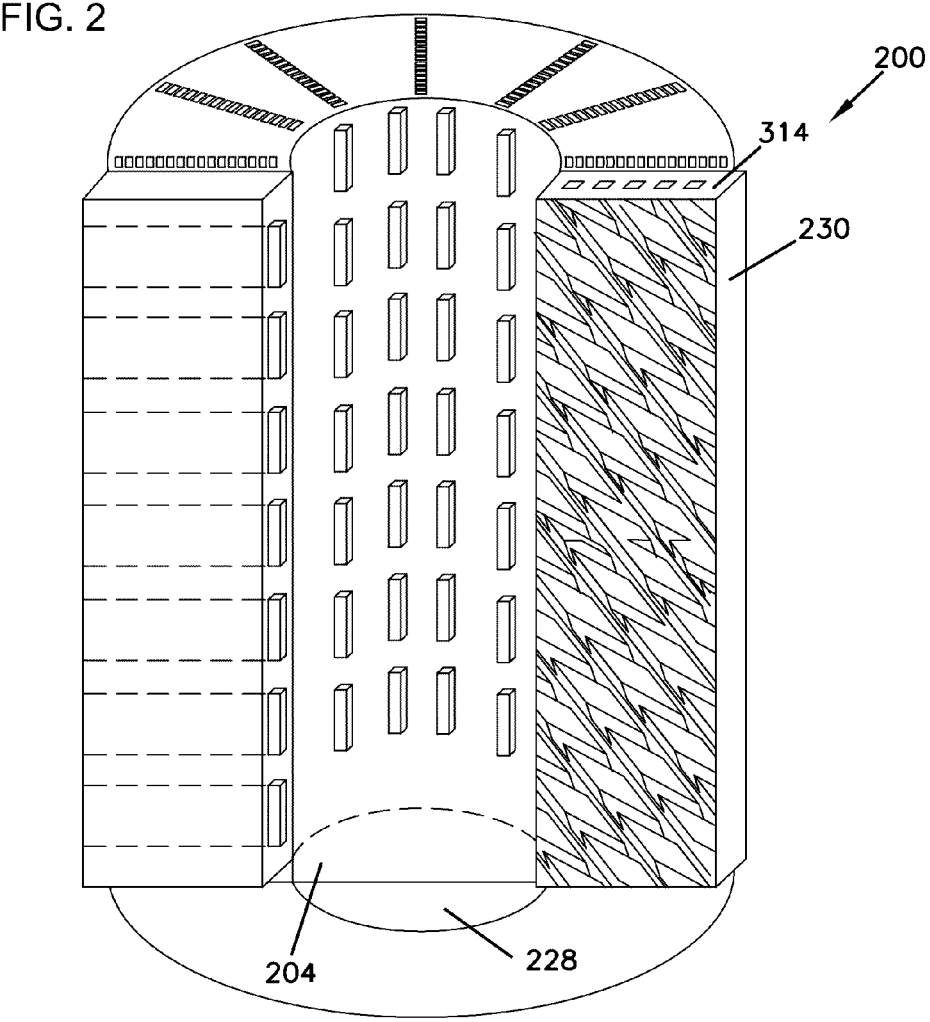
FIG. 2 is a cross-sectional view of the heat exchanger core shown in FIG. 1.
Figure 3:
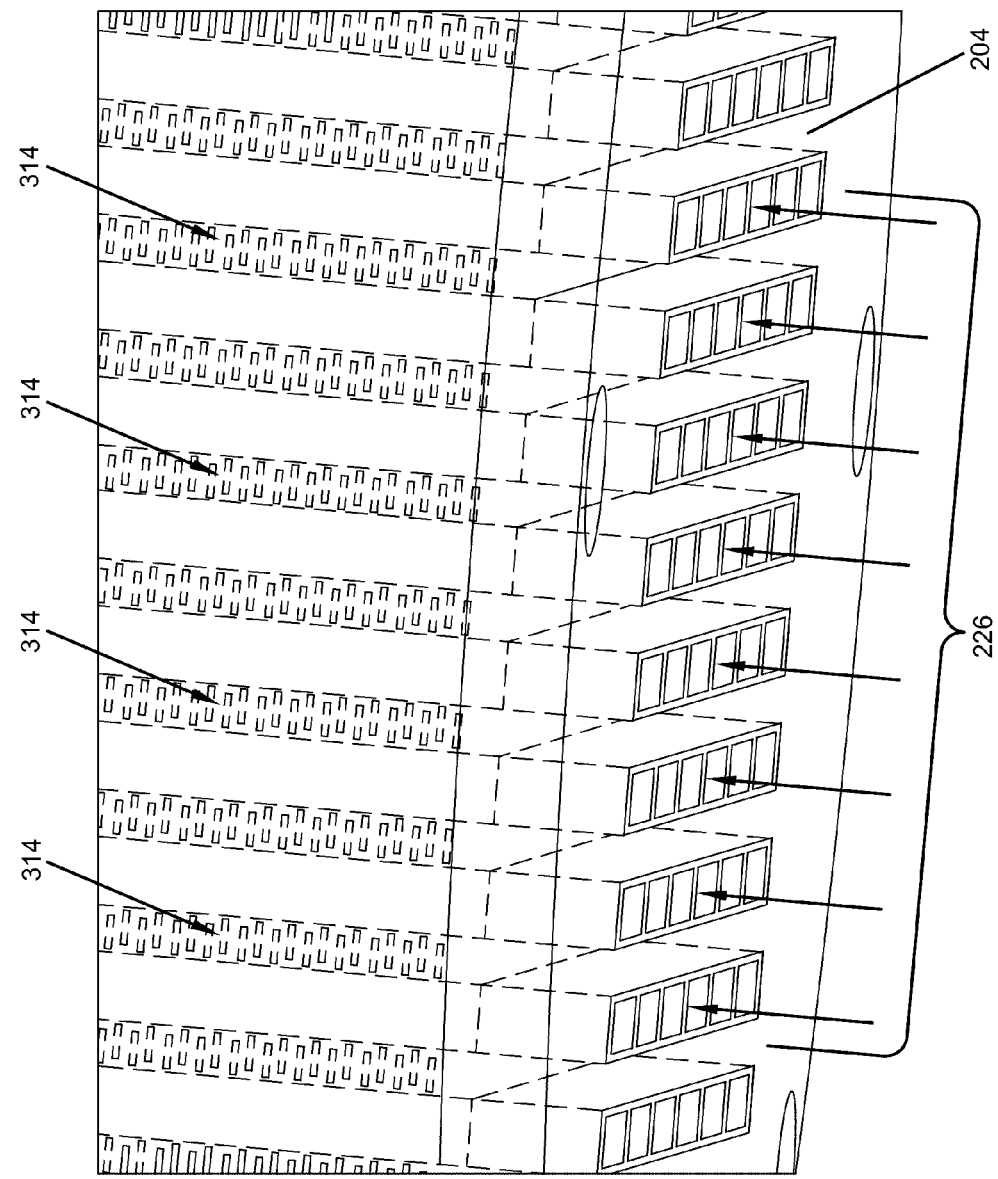
FIG. 3 is a top perspective view of a portion of the heat exchanger core shown in FIGS. 1 and 2.

With reference to FIGS. 1-3, an embodiment of a radial-flow heat exchanger core 200 for a heat exchanger is illustrated. The core 200 is an annular-shaped core having an axial length extending from a first end 212 to a second end 214, and a central fluid passageway 202 extending from the first end to the second end and defined by an interior wall 204 of the core. The core 200 also includes an exterior wall 208. The core 200 has a plurality of first fluid passageways 314 that are circumferentially spaced from one another and that extend generally axially from the first end 212 to the second end 214. Each of the first fluid passageways 314 is defined at least in part by a plurality of fins 302. The fins can be made of, for example, thermally conductive foam, such as metal foam or graphite foam, or made of made such as aluminum, or the fins can include a combination of aluminum fins and thermally conductive foam fins.

The core 200 also has a plurality of second fluid passageways 226 that are circumferentially spaced from one another and that extend generally radially from the central fluid passageway 202 through the exterior wall 208 of the core. The second fluid passageways 226 are separated from the first fluid passageways 314 so that a first fluid can flow through the first fluid passageways to exchange heat with, and without mixing with, a second fluid that flows through the second fluid passageways 226.

With reference to FIG. 2, the bottom of the central fluid passageway 202 of the core 200 is closed by a plate 228. Therefore, a first fluid that is introduced into the central fluid passageway 202 at the first end 212 is forced to flow radially outward through the fluid passageways 226. Alternatively, fluid introduced into the radial ends of the fluid passageways 226 must flow radially inward into the central fluid passageway 202 and then upward. In some embodiments, the bottom of the core could be open, and the upper end of the passageway 202 could be closed by a plate.

In the illustrated embodiment, the core 200 is constructed from a plurality of individual heat exchange units 300 that are connected together into an annular-shape. The units 300 are disposed between and connected to the interior wall 204 and the exterior wall 208. The core 200 is substantially cylindrical in shape with the fluid passageway 202 near the central portion thereof. The core 200 has a length L along an axial direction, parallel to the axis of the passageway 202, extending from the first end 212 to the second end 214.

In addition, the exterior wall 208 is formed by a plurality of circumferentially spaced bars 230. The bars 230 close the radial outer surface of the core 200 so that fluid flowing through the first fluid passageways 314 is forced to flow axially from one end to the other, with none of the fluid able to escape radially from the core.

In the illustrated embodiment, when viewed from either of the ends 212, 214, the core 200 is substantially circular with the passageway 202 also being substantially circular. However, other shapes are possible. For example, the core 200 can have a square shape, a rectangular shaped, a triangle shape, an elliptical shape, an oblong shape, or other geometric shape. Likewise, the passageway 202 can have a square shape, a rectangular shape, a triangle shape, an elliptical shape, an oblong shape, or other geometric shape. The type of the shape of the passageway 202 and the type of the shape of the core 200 can be substantially the same or they can be different.

In an embodiment, the first end 212 and the second end 214 are substantially identical in surface area, flow channel density, and/or structure, in order to mitigate pressure drop effects, which can arise from transitioning fluid flow between a plurality of small conduits and a large conduit.

In an alternative arrangement shown in FIGS. 7, 7A and 7B, the heat exchange units 300 are arranged so that the fluid passageways 226 extend axially from one end of the core to the other end, while the fluid passageways 314 extend radially. The construction of the core in FIG. 7 is otherwise similar to the core 200 in FIG. 2.

With reference to FIGS. 2, 2A, 2B and 7, 7A and 7B, and described further below with respect to FIGS. 4-6, each heat exchange unit 300 includes a plurality of fins 302 connected to a plate 304. Each of the fins 302 has a first end connected to and in thermal contact with a surface of the plate 304 and a second end being connected to and in thermal contact with the surface of the plate of an adjacent heat exchange unit 300. The fins 302, the plates 304, the interior wall 204 and the exterior wall 208 define a plurality of the first fluid passageways 314 for flow of a fluid generally in the axial direction from the first end 212 to the second end 214 (FIG. 2) or vice-versa.

Figure 2A:
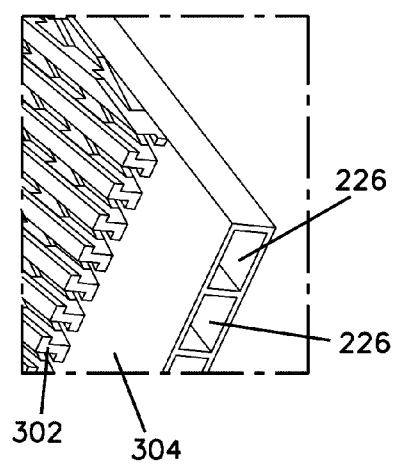
FIG. 2A is a close up view of a portion of a heat exchange unit of FIG. 2.
Figure 2B:
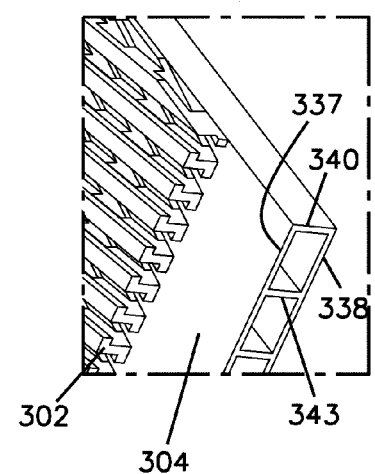
FIG. 2B is a close up view of a portion of a heat exchange unit of FIG. 2.

As described further below, the fins 302 can have numerous shapes. FIGS. 2, 2A and 2B shows the fins 302 as being diamond-shaped and the fluid passageways 314 are defined around the diamond-shaped fins 302.

In addition, each plate 304 defines a plurality of the second fluid passageways 226 that extend through each plate 304 from the passageway 202 through the interior wall 204 through the exterior wall 208 (FIG. 2). The passageways 226 fluidically isolate the fluid flowing therethrough from the fluid that flows through the fluid passageways 314.

Thus, the core 200 is configured to exchange heat between the first and second fluids via the plates 304 and the fins 302. The first fluid can flow through the fluid passageways 314 axially with the second fluid flowing through the passageways 226 radially as shown in FIG. 2, or the first fluid can flow through the fluid passageways 226 axially with the second fluid flowing through the passageways 314 radially as shown in FIG. 7.

As shown in FIG. 3, the heat exchange units 300 are connected together so that the fins 302 of one heat exchange unit are connected to and in thermal contact with the plate 304 of an adjacent heat exchange unit. At one end, the plates 304 are attached to the interior wall or facesheet 204 while at the opposite end, the plates 304 are attached to the exterior wall or facesheet 208. The outer ends of the plates 304 are suitably attached to the wall 208 to define discrete outlets of the passageways 226 to the exterior of the core. Likewise, the inner ends are attached to the interior wall in a similar manner to define discrete inlets for the passageways 226.

The fins 302 and the plates 304 are connected to each other in any suitable manner that permits conduction of thermal energy between the plates and the fins. For example, within each heat exchange unit 300, the fins can be connected to the plate by bonding with a thermal adhesive, welding, brazing, epoxy, and/or mechanical attachment. Similarly, the fins of one heat exchange unit can be connected to the plate of an adjacent heat exchange unit by bonding with a thermal adhesive, welding, brazing, epoxy, and/or mechanical attachment.

The ends of the plates 304 are attached to the interior wall 204 and to the exterior wall 208 by bonding, brazing, welding, and/or other suitable connection methods. In an embodiment, the ends are attached to the walls 204, 208 by friction stir welding (FSW).

FSW is a known method for joining elements of the same material. Immense friction is provided to the elements such that the immediate vicinity of the joining area is heated to temperatures below the melting point. This softens the adjoining sections, but because the material remains in a solid state, the original material properties are retained. Movement or stirring along the weld line forces the softened material from the elements towards the trailing edge, causing the adjacent regions to fuse, thereby forming a weld. FSW reduces or eliminates galvanic corrosion due to contact between dissimilar metals at end joints. Furthermore, the resultant weld retains the material properties of the material of the joined sections. Further information on FSW is disclosed in U.S. Patent Application Publication Number 2009/0308582, titled Heat Exchanger, filed on Jun. 15, 2009, which is incorporated herein by reference.

To facilitate FSW, it is preferable that the interior wall and the exterior wall consist of the same material as the plates 304 that penetrate through the walls.

The fins described herein can be made partially or entirely from foam material. In one example, the fins can consist essentially of, or consist of, foam material. The foam material may have closed cells, open cells, coarse porous reticulated structure, and/or combinations thereof. In an embodiment, the foam can be a metal foam material. In an embodiment, the metal foam includes aluminum, titanium, copper or bronze foam. In another embodiment, the foam can be a graphite foam. In an embodiment, the fins do not include metals, for example aluminum, titanium, copper, or bronze. In an embodiment, the fins are made only of graphite foam having an open porous structure.

Figure 4:
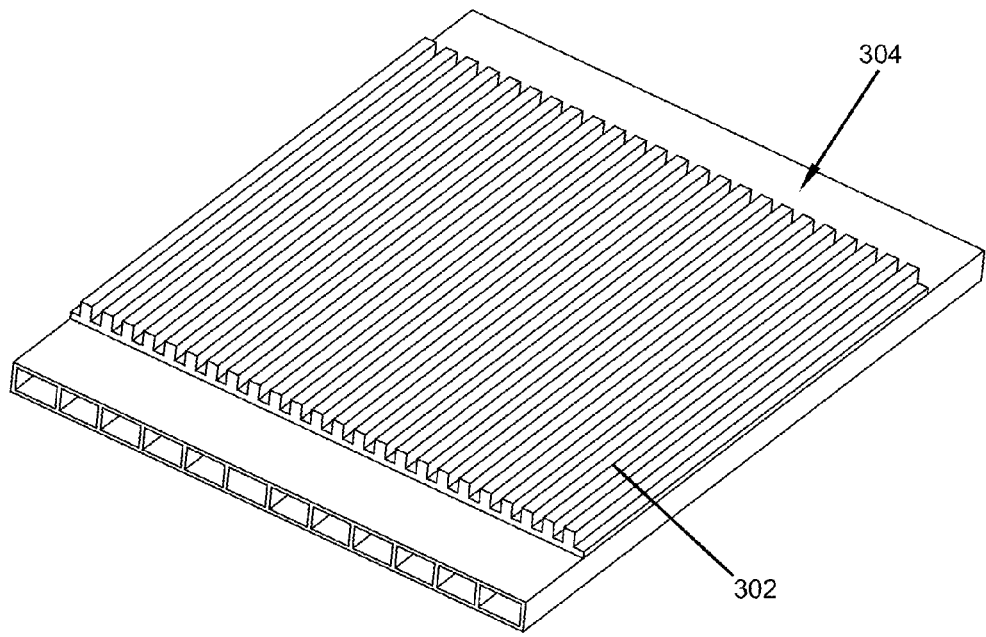
FIG. 4 shows another embodiment of a plate-fin heat exchange unit useable with the radial flow heat exchanger core.
Figure 5:
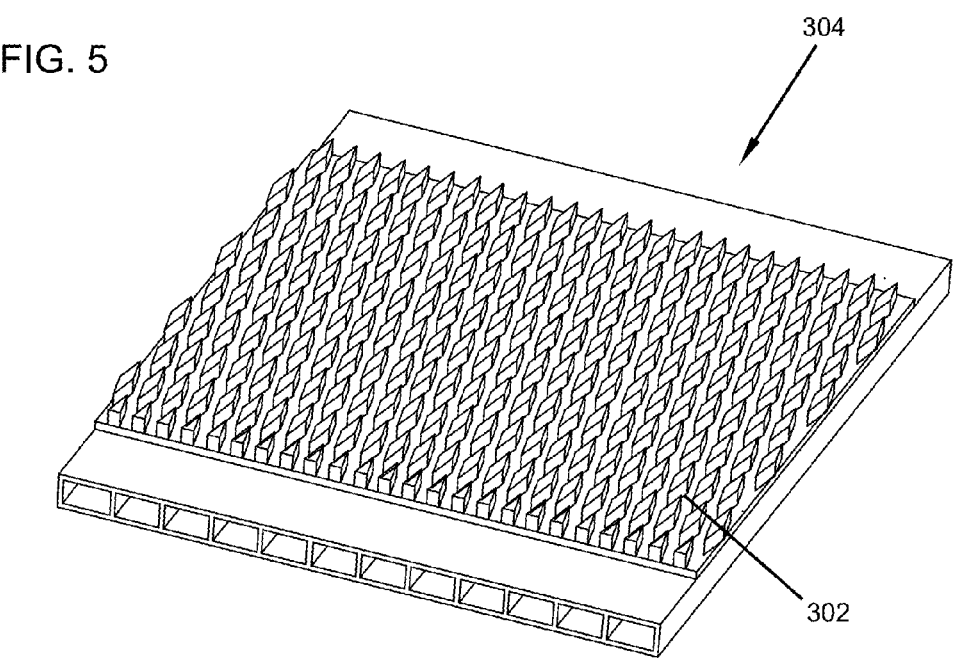
FIG. 5 shows yet another embodiment of a plate-fin heat exchange unit.
Figure 6:
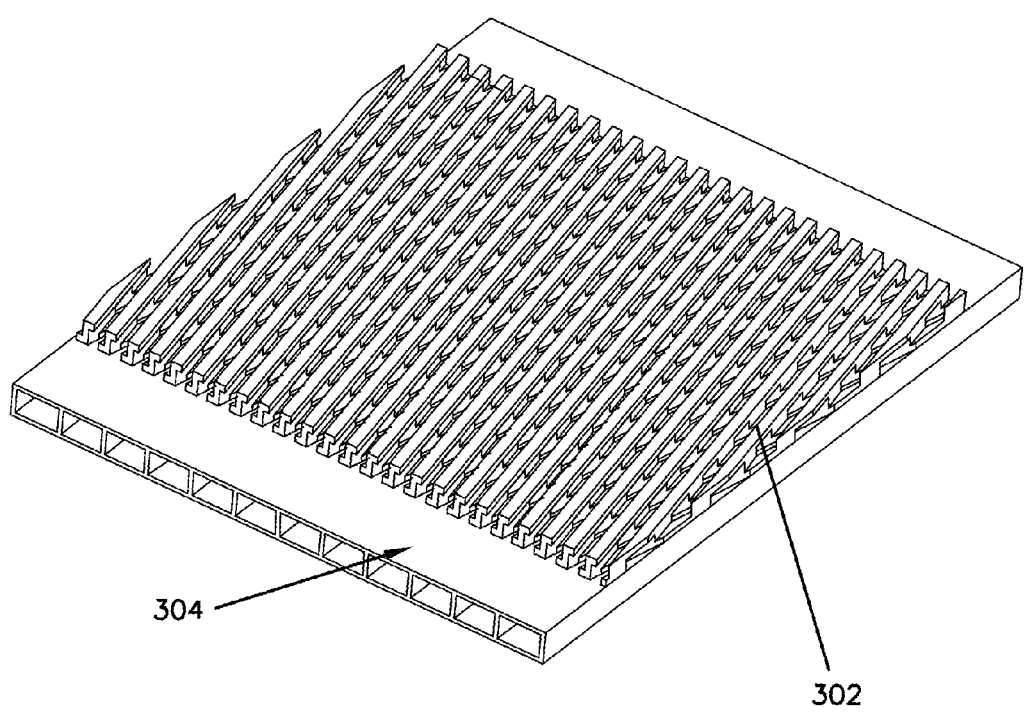
FIG. 6 shows yet another embodiment of a plate-fin heat exchange unit.

Returning to FIGS. 2 and 7, along with FIGS. 4-6, and particular reference to FIG. 2B, each plate 304 comprises a first plate 337 and a second opposing plate 338 separated from each other by side plates 340 and a plurality of intermediate plates 343. The plates 337, 338, the side plates 340 and the intermediate plates 343 collectively define a frame. The first plate 337 and the second plate 338 have opposing surfaces, respectively, facing toward one another to which the side plates 340 and the intermediate plates 343 are secured. The plates 337, 338, the side plates 340 and the intermediate plates 343 define the plurality of enclosed fluid passageways 226 extending through the plate from a first end to a second end. The enclosed fluid passageways 226 do not extend through the plates 337, 338 or the first and second opposing major surfaces thereof. The plate may be formed by an extrusion process, wherein the plate is formed to be a single unit of a single material. Thus, the plate can be formed to not have any galvanic cells and/or galvanic joints.

The fins 302 are disposed on an outward facing, first major surface of the plate 337, with each fin having a first end connected to and in thermal contact with the surface of the plate 337. Each fin also has a second end spaced from the surface. Fluid paths are defined by the fins and the plate surface extending generally from the second ends of the fins to the first ends thereof.

Fin shapes other than the diamond-shaped fins 302 in FIGS. 2 and 7 can be used. For example, FIG. 4 shows the fins being elongated, linear and rectangular in shape, and having substantially flat tops for stacking with the surface of a plate of an adjacent heat exchange unit when stacked with other heat exchange units to form the annular core 200.

FIG. 5 shows the fins being diamond-shaped and having substantially flat top surfaces for stacking with the surface of a plate of an adjacent heat exchange unit.

FIG. 6 shows the fins having a cross corrugated diamond-shaped configuration, for example approximately 10 degree cross-corrugations, and having substantially flat top surfaces for stacking with the surface of a plate or frame of another heat exchange unit.

An "X"-degree cross corrugated diamond-shaped configuration is used herein to mean, when viewed from the top perspective, a configuration wherein a first straight portion of the fins and a second straight portion of the fins is provided in a crisscross configuration forming substantially diamond-shaped holes. The numerical value for X indicates generally the vertical angle at an intersection of the first and the second straight portions, when the fins are viewed from the top. X can range from about 0 degrees to about 90 degrees or less.

Figure 8:
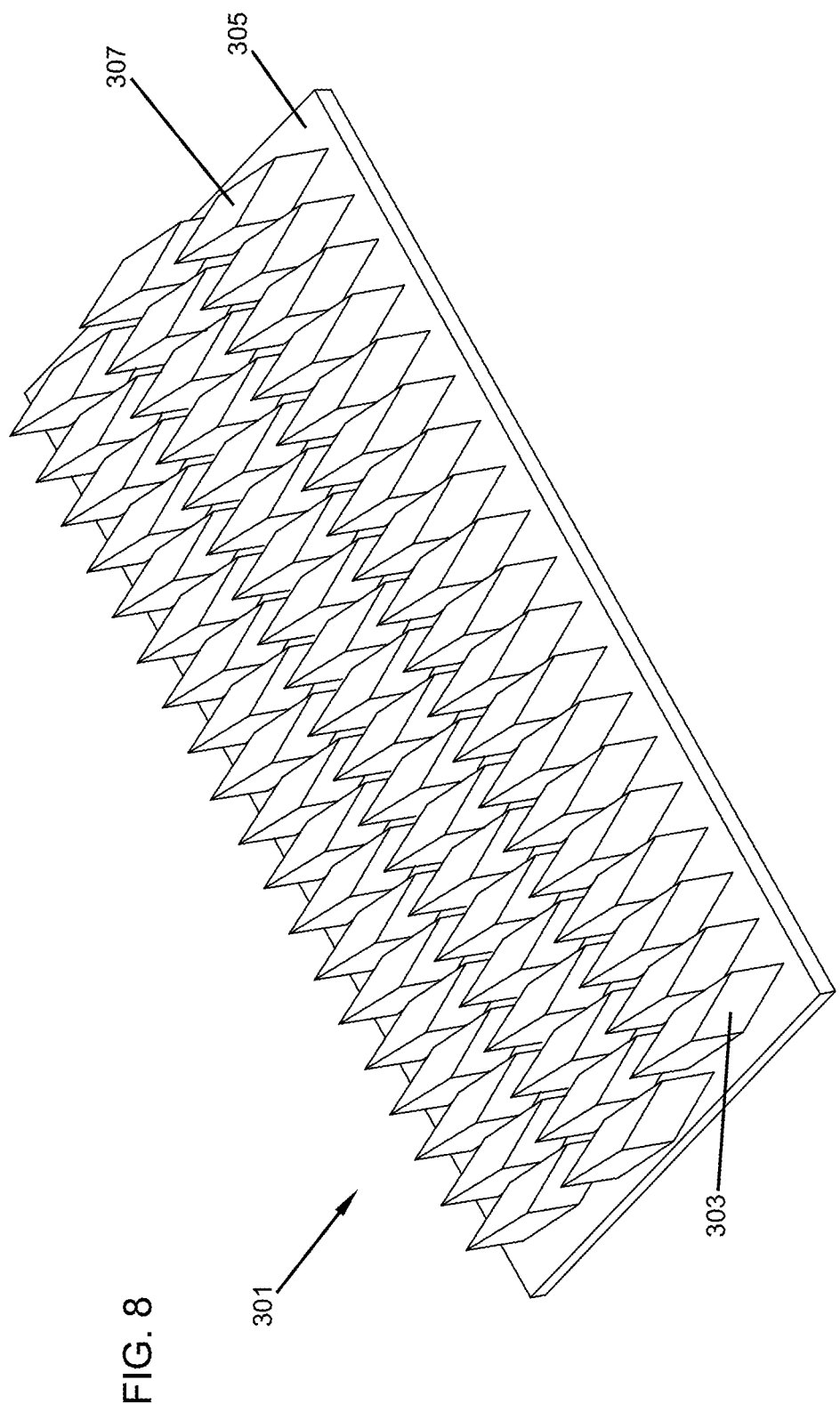
FIG. 8 shows an embodiment of a plate-fin heat exchange unit for the heat exchanger core.

FIG. 8 shows a portion of a heat exchange unit 301 with fins 303 having a diamond-shaped configuration. The fins 303 are joined to a plate 305 to form a thermal transfer path between the first fluid and the second fluid. The fins 303 have a diamond shaped top end surface 307, when viewed from the top perspective, which is substantially flat for stacking and for making contact with another surface, for example the surface of the plate of another heat exchange unit 300. The fins 303 are disposed on a major surface of the plate 305, each fin 303 having a first end connected to and in thermal contact with the surface of the plate. Each fin 303 also has a second end spaced from the surface of the plate 305, where the end defines the end surface 307. As would be apparent to a person of ordinary skill in the art, the aspect ratio (i.e. the ratio of the longer dimension of the end surface 307 to its shorter dimension), the height, the width, the spacing and other dimensional parameters of the fins 303 can be varied depending in part upon the application and the desired heat transfer characteristics.

FIGS. 11A-M show additional embodiments of fin arrangements that can be used with the heat exchange units described herein. In all embodiments of fins arrangements in FIGS. 11A-M, various dimensional parameters of the fins such as the aspect ratio, spacing, height, width, and the like can be varied depending in part upon the application and the desired heat transfer characteristics of the fins and the heat exchange units.

Figure 11A:
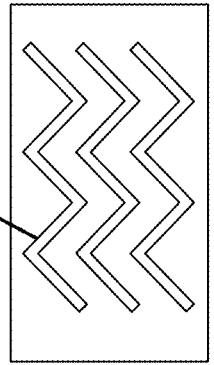
Figure 11B:
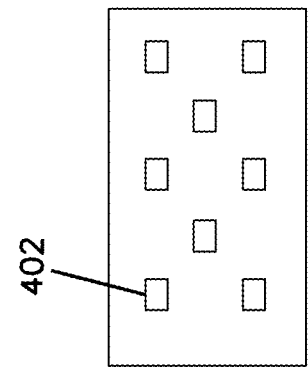
Figure 11C:
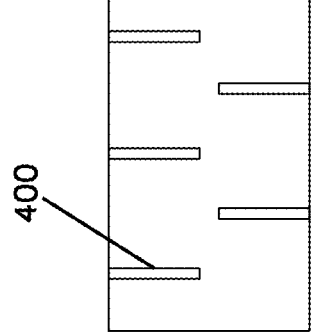

FIG. 11A shows a top view of fins 400 where the fins 400 are disposed in a baffled offset configuration. FIG. 11B shows a top view of another embodiment of fins 402 where the fins 402 are disposed in an offset configuration. When viewed from the top, each of the fins 402 may have the shape of, but not limited to, square, rectangular, circular, elliptical, triangular, diamond, or any combination thereof. FIG. 11C shows a top view of another embodiment of fins 404 where the fins 404 are disposed in a triangular-wave configuration. Other types of wave configurations, such as for example, square waves, sinusoidal waves, sawtooth waves, and/or combinations thereof are also possible.

Figure 11D:
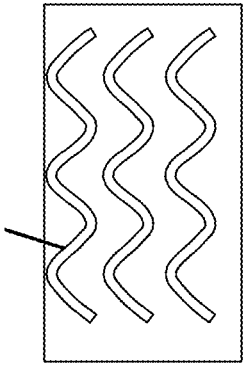
Figure 11E:
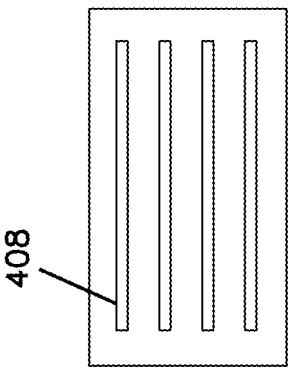
Figure 11F:
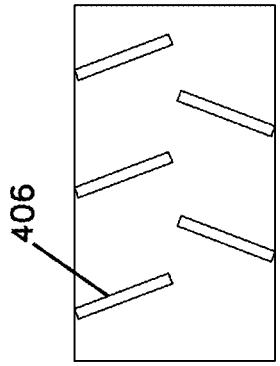

FIG. 11D shows a top view of another embodiment of fins 406 where the fins 406 are disposed in an offset chevron configuration. FIG. 11E shows a top view of an embodiment of fins 408 where the fins 408 are disposed in a rectangular linear configuration. FIG. 11F shows a top view of an embodiment of fins 410 where the fins 410 are disposed in a curved wave configuration. An example of the curved wave configuration is a sinusoidal wave configuration.

The configuration of the fins, when viewed from the top, does not necessarily define the direction of fluid flow. When viewing FIGS. 11A-F, one skilled in the art will understand that the direction of fluid flow past the fins can be from top to bottom, bottom to top, right to left, left to right, and any direction therebetween.

Figure 11J:
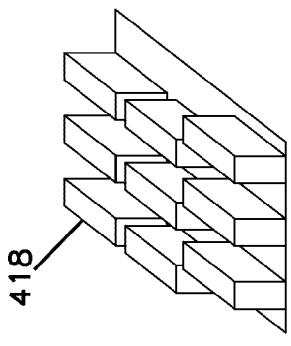
Figure 11I:
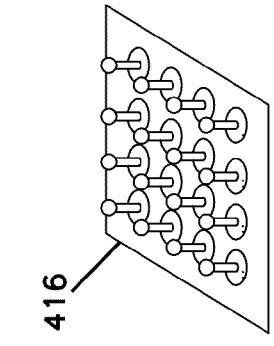
Figure 11H:
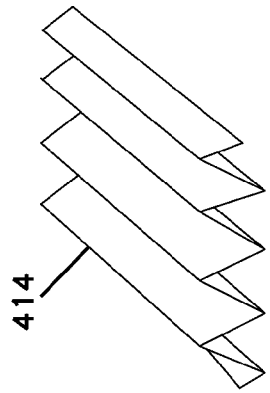
Figure 11G:
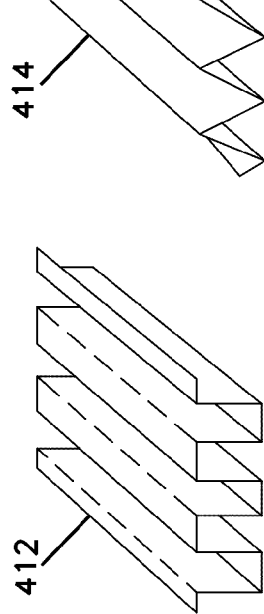

FIG. 11G shows fins 412 having rectangular cross-sectional shapes in a direction perpendicular to the plane defined by the plate of the heat exchange unit. FIG. 11H shows fins 414 having triangular cross-sectional shapes in a direction perpendicular to the plane defined by the plate of the heat exchange unit.

FIG. 11I shows fins 416 having pin-like shapes in a direction perpendicular to the plane defined by the plate of the heat exchange unit. A pin-like shape is used herein to mean a shape having a shaft portion and an enlarged head portion, wherein the head portion has a cross-sectional area that is larger than the cross-sectional area of the shaft portion. However, a pin-like shape can also encompass a shape having just a shaft portion without an enlarged head portion. When viewed from above, the fins 416 may have the shape of, including but not limited to, square, rectangular, circular, elliptical, triangular, diamond, or any combination thereof. The fins 416 can be formed by, for example, stamping the foam to form the pin-like shapes.

Figure 11M:
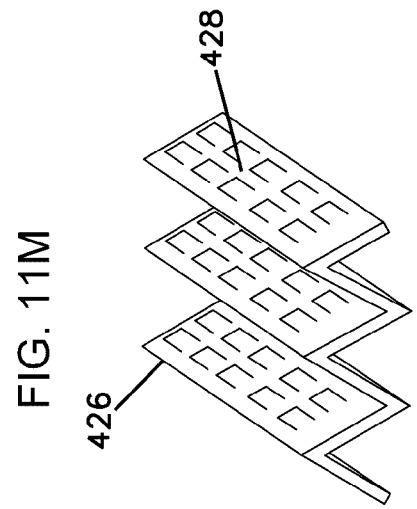
Figure 11L:
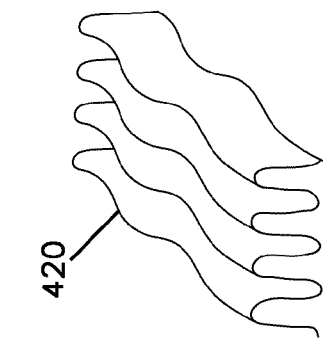
Figure 11K:
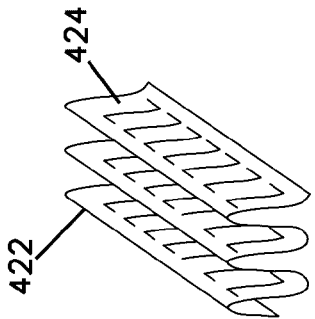

FIG. 11J shows fins 418 having offset rectangular fins. FIG. 11K shows fins 420 having wavy, undulating shapes. FIG. 11L shows fins 422 having louvered surfaces 424 that allow cross-flow of fluid between the channels defined along the main direction of the fins 422. FIG. 11M shows fins 426 having perforations 428 that allow cross-flow of fluid between the channels defined along the main direction of the fins.

One skilled in the art would understand that the various fin configurations described herein may be used in combination with each other and in any of the heat exchange units described herein, based on factors such as the flow regime, area and flow paths within the heat exchanger, as well as the application of the heat exchanger.

Figure 9:
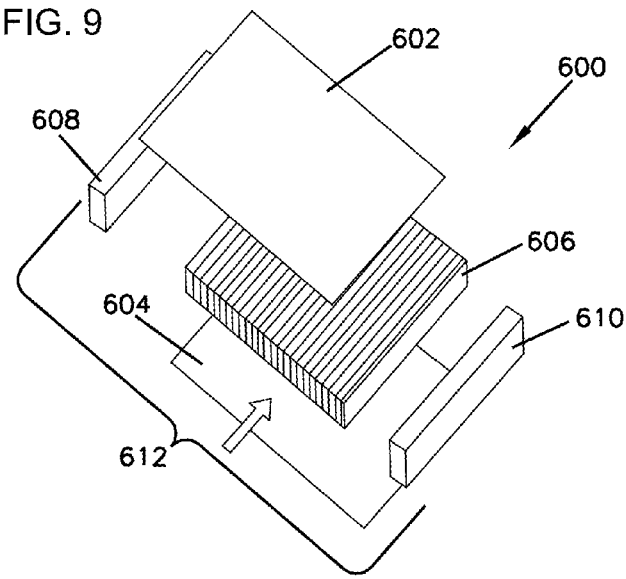
FIG. 9 shows another embodiment of a heat exchange unit.

FIG. 9 shows another embodiment of a plate-fin heat exchange unit 600. The heat exchange unit 600 includes a first plate 602 and a second plate 604 separated by a plurality of fins 606. The fins 606 are in thermal contact with the first plate 602 and the second plate 604. The fins 606 define a plurality of fluid paths for flow of a fluid. The embodiment of the heat exchange unit 600 shown in FIG. 9 also includes side plates 608, 610, such that the first and second plates 602, 604 and the side plates 608, 610 together define a frame 612, and the fins 606 are disposed inside the frame 612. In another embodiment, the fins 606 are disposed outside the frame 612, and connected to the first, second, or both plates 602, 604. In another embodiment, the fins 606 are disposed both inside and outside the frame 612.

Figure 10A:
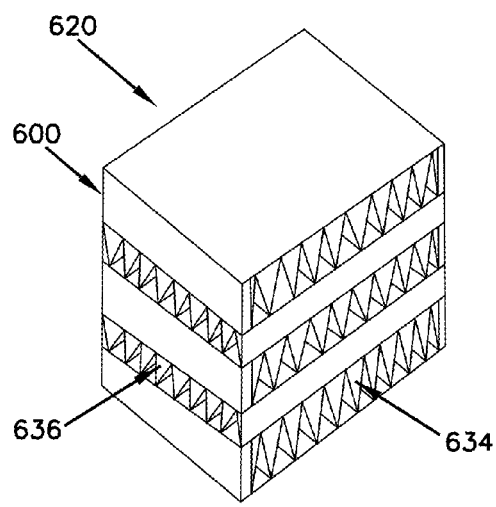
FIG. 10A shows an embodiment of stacked heat exchange units.

FIG. 10A shows a heat exchange stack 620 constructed from a plurality of the plate-fin heat exchange units 600 shown in FIG. 9. The units 600 are stacked on each other with each level rotated 90 degrees relative to an adjacent level. Therefore, the stack defines one or more fluid paths 634 in one direction, and one or more fluid paths 636 that extend in another direction approximately 90 degrees relative to the fluid paths 634. In the illustrated embodiment, the units 600 are arranged such that the fluid paths 634, 636 alternate with each other in a cross-flow pattern. A first fluid can be directed through the fluid paths 634 while a second fluid can be directed through the fluid paths 636 for exchanging heat with the first fluid in a cross-flow relationship. When stacked, each unit 600 can share a plate 602, 604 with an adjoining unit 600, or each unit 600 can have its own plates 602, 604.

Figure 10B:
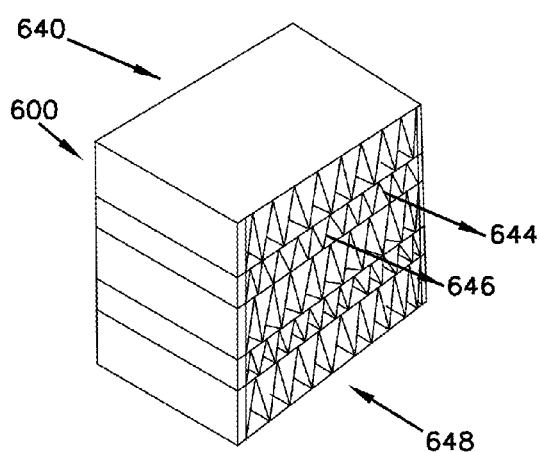
FIG. 10B shows another embodiment of stacked heat exchange units.

FIG. 10B shows a heat exchange stack 640 where the units 600 are arranged so that the fluid flow paths 644, 646 defined by each unit are parallel to one another. A first fluid can be directed through the fluid paths 644 while a second fluid can be directed through the fluid paths 646 for exchanging heat with the first fluid. The fluids in the paths 644, 646 can flow in the same directions (parallel or co-current flow) or, as shown by the arrow 648, they can flow in opposite directions (counter-current flow).

The plates in the illustrated embodiments have been shown as rectangular or square plates. However, the fins can be used with plates of any shape, including but not limited to circular, elliptical, triangular, diamond, or any combination thereof, with the fins disposed on a plate or disposed between plates, within a shell or used without a shell. For example, the foam fins can be disposed between circular plates which are disposed within a shell, in a heat exchanger of the type disclosed in U.S. Pat. No. 7,013,963.

FIGS. 12A, 12B and 12C show a radial-flow heat exchanger described herein utilized as a condenser 344. The condenser 344 includes a cold water pipe 346 for introducing cold sea water 348 into the condenser. The cold sea water 348 is directed to flow through the radial passageways 226 of the core 200. A working fluid 350 in vapor form, for example $NH_3$ vapor, is directed into the fins of the core and then flows axially though the fluid passageways 314. Heat is transferred from the working fluid 350 to the cold sea water 348. The transfer of heat results in loss of heat in the working fluid 350, which causes a phase change in the vapor, and the working fluid is condensed into a liquid to form a condensate 352. The working fluid condensate 352 flows via gravity and is then collected and pumped out of the condenser 344. The cold sea water 348 flows radially out and leaves the core 200 towards the lower portion of the condenser 344 via pressure difference created by pump devices 354 and discharged to the ocean.

FIGS. 13A, 13B and 13C show a radial-flow heat exchanger described herein utilized as an evaporator 356. The evaporator 356 includes a warm water intake 358 for introducing warm sea water 360 into the evaporator 356. The warm sea water 360 is directed to flow through the axial passageways 226 which are rotated to the position shown in FIG. 7. A working fluid 352, for example $NH_3$ liquid, is introduced into the annulus of the passageway 202 and then flows radially from the core passageway 202 though the foam fins. Heat is transferred from the warm sea water 360 to the working liquid 352 to cause the working liquid to vaporize into a vapor 350. The vapor 350 rises and flows out of the evaporator 356. The warm sea water 361 leaving the core 200 flows out towards the lower portion of the evaporator 356 via pressure difference created by pump devices 354 and discharged to the ocean.

The heat exchange devices, configurations and flow orientations described in FIGS. 12A-C and 13A-C are exemplary only and can vary. In other embodiments of the evaporator and condenser heat exchanger configurations, the sea water flows can be axial or radial, and the working fluid flows may be axial or radial.

FIG. 14 shows a schematic diagram of an embodiment of an OTEC power generation system that can employ the heat exchangers described herein. It is to be understood that the heat exchangers described herein are not limited to OTEC applications and can be employed in any type of system that utilizes heat exchangers, including other power generation applications as well as non-power generation applications. The heat exchangers described herein can be employed in any number of applications, including but not limited to, low thermal driving force applications such as OTEC, power generation applications, and non-power generation applications such as refrigeration and cryogenics.

The OTEC system 1100 comprises turbo-generator 1104, a closed-loop conduit 1106 for a primary or working fluid, heat exchanger/evaporator 1110-1, heat exchanger/condenser 1110-2, pumps 1114, 1116, and 1124, and conduits 1120, 1122, 1128, and 1130. Pump 1114 pumps a primary fluid (i.e., working fluid 1108), for example liquid ammonia or other suitable fluid, through the closed-loop conduit 1106 to the heat exchanger 1110-1.

Heat exchanger 1110-1 operates as an evaporator with the pump 1116 drawing warm secondary fluid (i.e., seawater from surface region 1118) into the heat exchanger 1110-1 via the conduit 1120. The heat exchanger 1110-1 allows heat from the secondary fluid to be transferred to and absorbed by the working fluid 1108, which induces the working fluid 1108 to vaporize. After passing through the heat exchanger 1110-1, the now slightly cooler secondary fluid is ejected back into the body of water via the conduit 1122.

The expanding working fluid 1108 vapor is forced through the turbo-generator 1104, thereby driving the turbo-generator to generate electrical energy. Once it has passed through the turbo-generator 1104, the working fluid enters the heat exchanger 1110-2.

At the heat exchanger 1110-2, the pump 1124 draws cold secondary fluid into the heat exchanger 1110-2 via the conduit 1128. The secondary fluid absorbs heat from the working fluid in the heat exchanger 1110-2. As a result, the working fluid 1108 condenses back into liquid form. The pump 1114 pumps the condensed working fluid 1108 back into the heat exchanger 1110-1 where it is again vaporized, thereby continuing the cycle.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A radial flow plate-fin heat exchanger, comprising:
    an annular-shaped core having an axial length extending from a first end to a second end, and a central fluid passageway extending from the first end to the second end and defined by an interior wall of the core;
    a plate closing the central fluid passageway at either the first end or the second end and preventing fluid that is introduced into the central fluid passageway from flowing out through the first end or the second end closed by the plate;
    the annular-shaped core is formed by a plurality of heat exchange units that are connected together into an annulus, each of the heat exchange units includes:
        an extruded plate that is formed as a one piece, single unit of a single material, the extruded plate defines a plurality of integrally formed, enclosed fluid passageways through the extruded plate, the enclosed fluid passageways are formed by the one piece, single unit of a single material;
        and a plurality of discrete fins formed from graphite foam that are connected to, extend from, and are in thermal contact with a first surface of the extruded plate, each discrete fin having a flat top surface that is not directly connected to the flat top surface of an adjacent discrete fin; and
    for each heat exchange unit, the flat top surfaces of the discrete fins thereof are connected to and in thermal contact with a second surface of the extruded plate of an adjacent heat exchange unit;
    the extruded plates of the heat exchange units are arranged so that the enclosed fluid passageways thereof are circumferentially spaced from one another and extend either axially from the first end to the second end or extend radially from the central fluid passageway through an exterior wall of the core, and the discrete fins define fluid passageways that are circumferentially spaced from one another and that extend generally perpendicular to the enclosed fluid passageways of the extruded plates;
    wherein the enclosed fluid passageways of the extruded plates are fluidly separated from the fluid passageways defined by the discrete fins so that a first fluid that flows through the enclosed fluid passageways of the extruded plates does not mix with a second fluid that flows through the fluid passageways defined by the discrete fins; and
    the enclosed fluid passageways and the fluid passageways defined by the discrete fins are not closed by the plate closing the central fluid passageway.

2. The radial flow plate-fin heat exchanger according to claim 1, wherein the discrete fins consist essentially of graphite foam.

3. The radial flow plate-fin heat exchanger according to claim 1, wherein the discrete fins are diamond-shaped or straight.

4. The radial flow plate-fin heat exchanger according to claim 1, wherein each extruded plate of the plurality of heat exchange units has first and second ends, the integrally formed, enclosed fluid passageways extend from the first end to the second end, and the first and second ends of each plate are friction-stir welded to the interior wall and the exterior wall, respectively.

5. The radial flow plate-fin heat exchanger according to claim 1, wherein for each heat exchange unit, the discrete fins are joined to the surface of the extruded plate of the respective heat exchange unit by bonding or brazing; and the flat top surfaces of the discrete fins of each heat exchange unit are connected to the surface of the extruded plate of the adjacent heat exchange unit by bonding or brazing.

6. A radial flow heat exchanger, comprising:
    an annular-shaped core having an axial length extending from a first end to a second end, a central fluid passageway extending from the first end to the second end and defined by an interior wall of the core, and an exterior wall;

a plate closing the central fluid passageway at either the first end or the second end and preventing fluid that is introduced into the central fluid passageway from flowing out through the first end or the second end closed by the plate;

the annular-shaped core is formed by a plurality of heat exchange units that are connected together into an annulus, each of the heat exchange units includes:

an extruded plate that is formed as a one piece, single unit of a single material, the extruded plate defines a plurality of integrally formed, enclosed fluid passageways through the extruded plate, the enclosed fluid passageways are formed by the one piece, single unit of a single material;

and a plurality of discrete fins formed from graphite foam that are connected to, extend from, and are in thermal contact with a first surface of the extruded plate, each discrete fin having a flat top surface that is not directly connected to the flat top surface of an adjacent discrete fin; and for each heat exchange unit, the flat top surfaces of the discrete fins thereof are connected to and in thermal contact with a second surface of the extruded plate of an adjacent heat exchange unit;

each plate of the plurality of heat exchange units has first and second ends, and the first and second ends of each extruded plate are friction-stir welded to the interior wall and the exterior wall, respectively, and each extruded plate defines radial fluid passageways, and the radial fluid passageways of each extruded plate are circumferentially spaced from the radial fluid passageways of the other extruded plates, and the radial fluid passageways of each extruded plate extend generally radially through the interior wall and through the exterior wall of the annular-shaped core to place the central fluid passageway in fluid communication with an exterior of the annular-shaped core;

the fins define fluid passageways that are circumferentially spaced from one another and that extend generally axially from the first end to the second end of the core, and the generally axially extending fluid passageways and the radial fluid passageways are not closed by the plate; and the radial fluid passageways are separated from the generally axially extending fluid passageways defined by the fins so that a first fluid that flows through the generally axially extending fluid passageways defined by the fins does not mix with a second fluid that flows through the radial fluid passageways.

7. The radial flow heat exchanger according to claim 6, wherein the extruded plates are made of metal, and the fins consist essentially of graphite foam.

8. The radial flow heat exchanger according to claim 6, wherein the fins are diamond-shaped.

9. The radial flow heat exchanger according to claim 6, wherein for each heat exchange unit, the fins are joined to the surface of the extruded plate of the respective heat exchange unit by bonding or brazing; and the fins of each heat exchange unit are connected to the surface of the extruded plate of an adjacent heat exchange unit of the annulus by bonding or brazing.

\* \* \* \* \*